United States Patent [19]

Tuttle

[11] Patent Number: 5,719,586
[45] Date of Patent: *Feb. 17, 1998

[54] SPHERICAL ANTENNA PATTERN(S) FROM ANTENNA(S) ARRANGED IN A TWO-DIMENSIONAL PLANE FOR USE IN RFID TAGS AND LABELS

[75] Inventor: John R. Tuttle, Boise, Id.

[73] Assignee: Micron Communications, Inc., Boise, Id.

[ * ] Notice: The term of this patent shall not extend beyond the expiration date of Pat. No. 5,448,110 and 5,572,226.

[21] Appl. No.: 584,788

[22] Filed: Jan. 11, 1996

Related U.S. Application Data

[63] Continuation of Ser. No. 422,007, Apr. 11, 1995, Pat. No. 5,572,226, which is a continuation of Ser. No. 137,699, Oct. 14, 1993, abandoned, which is a continuation of Ser. No. 884,507, May 15, 1992, abandoned.

[51] Int. Cl.$^6$ .................................................. H01Q 21/00
[52] U.S. Cl. ........................ 343/726; 343/728; 343/741; 343/795
[58] Field of Search ............................ 343/726–728, 343/741, 742, 793, 795, 788, 867, 866; 340/505, 572, 825.54

[56] References Cited

U.S. PATENT DOCUMENTS

| | | | |
|---|---|---|---|
| 3,721,990 | 3/1973 | Gibson et al. | 343/726 |
| 4,809,009 | 2/1989 | Grimes et al. | 343/726 |
| 5,051,726 | 9/1991 | Copeland et al. | 343/742 |
| 5,084,699 | 1/1992 | DeMichele | 343/867 |
| 5,103,235 | 4/1992 | Clemens | 343/742 |
| 5,126,749 | 6/1992 | Kaltner | 343/742 |
| 5,198,826 | 3/1993 | Ito | 343/726 |
| 5,448,110 | 9/1995 | Tuttle et al. | 340/825.54 |
| 5,572,226 | 11/1996 | Tuttle | 343/726 |

*Primary Examiner*—Donald T. Hajec
*Assistant Examiner*—Tan Ho

[57] ABSTRACT

The present invention introduces an RFID system that comprises a two-dimensional antenna configuration having a dipole in combination with a loop antenna or a second dipole with their dipole axes at approximately a 90° angle to one another. The pattern of two dipole antennas combined with the pattern of a single loop antenna, allows the sequential combination of the patterns to represent a nearly spherical antenna pattern in three dimensions, while the antennas reside in a two-dimensional plane. The presence of multiple antennas also allows for a method to switch among the multiple antennas to find the antenna or combination of antennas that create(s) the strongest RF communication link thereby enabling more efficient transmitted power or more directional reception coverage. Improving efficiency can be further improved by taking this concept one step further by adding multiple antennas into the interrogator unit. Now the possibility exists whereby the best RF communication possible can be established between the interrogator and transceiver units by switching to the best antenna combination that would most efficiently pass an RF signal between the interrogator and the transceiver before and after which any of the antennas are now free to be used for trickle charging the chargeable battery cell(s) that reside in the transceiver unit.

8 Claims, 3 Drawing Sheets

SPHERICAL ANTENNA PATTERN(S) FROM ANTENNA(S) ARRANGED IN A TWO-DIMENSIONAL PLANE FOR USE IN RFID TAGS AND LABELS

CROSS REFERENCE TO RELATED APPLICATION

This is a continuation to U.S. patent application Ser. No. 08/422,007, filed Apr. 11, 1995 now U.S. Pat. No. 5,572,226, which is a continuation to U.S. patent application Ser. No. 08/137,699, filed Nov. 14, 1993 now abandoned, which is a continuation of U.S. patent application Ser. No. 07/884,507, filed May 15th, 1992 now abandoned.

FIELD OF THE INVENTION

This invention relates generally to the field of radio frequency transceiver systems and in particular to radio frequency identification (RFID) devices (or tags). More specifically, a nearly spherical antenna pattern is developed from multiple antennas in a two-dimensional plane as well as an antenna switching method to utilize the multiple antennas.

BACKGROUND OF THE INVENTION

The field of RFID systems has evolved over the past years from systems developed in relatively large packages (size of a cigarette package) containing battery powered transmission/receiving circuitry or transceiver, such as the identification system disclosed in U.S. Pat. No. 4,274,083, to passive systems (the size of a credit card) in which the transceiver receives its power from the base station or interrogator, such as the identification system disclosed in U.S. Pat. No. 4,654,658.

Although a low-cost RFID system having a battery powered transceiver allows for greater distance between the interrogator and the transceiver units, the physical size of the transceiver unit has pushed the industry towards the passive transceiver technology as disclosed in U.S. Pat. Nos. 4,654,658 and 4,730,188. However, the limit in RF communication distance between transceiver and interrogator in low-cost passive systems is in the 2 foot or less range if reasonable accuracy of information collected is to be achieved and low power, low-cost interrogators are to be used.

U.S. Pat. No. 4,724,427 discloses a passive RFID transceiver as well as a hybrid battery operated version which addresses both types of RFID systems.

The memory used in RFID systems depends on the type of system used wherein, most passive systems use a programmable read only memory (PROM) of some sort that will retain its programmed data even when power is disrupted or removed while a battery backed system may use any memory type, including random access memory (RAM), that requires a continuous power source to retain programmed data.

Though an RFID system may vary in transceiver type, the memory used and circuitry configuration, all RFID systems have a common characteristic: that being a receive/send antenna(s) component. The present invention discloses the development of a three-dimensional spherical antenna pattern that is constructed from elements arranged in a two-dimensional plane, a method for switching to various antenna elements and passive recharging of secondary battery cell(s) powering RFID transceiver tags, each of which will allow improved operation of compatible RFID systems that will readily be recognized by one skilled in the art in accordance with the present invention described herein. Also, all U.S. patents cited herein are hereby incorporated by reference.

SUMMARY OF THE INVENTION

The present invention introduces an RFID system that comprises a two-dimensional antenna configuration that can create a three-dimensional spherical antenna pattern, an antenna switching method and a method to utilize an RF signal for trickle charging passive battery cells resident in the tag transceiver unit.

The two-dimensional antenna configuration is composed of a combination of one or two dipole antennas and/or a single loop antenna. If two dipoles are used it is preferred to have them arranged such that their axes at approximately a 90° angle to one another. If a dipole and a loop are used, any desired antenna orientation in the plane may be selected. It is well known that a simple dipole antenna driven by an RF voltage source produces a toroidal shaped electromagnetic field centered about the dipole axis. Therefore, when the pattern of a dipole antenna axis is combined with another dipole or the toroidal pattern of a single loop antenna (which performs as if it were a dipole with its axis through the center of the loop), a nearly spherical antenna pattern results while the physical elements exist essentially in a two-dimensional plane. When all three elements are combined, with the second dipole's axis at approximately a 90° angle to the first dipole's axis, the pattern is further filled in and the antennas remain in the two-dimensional plane.

Because the tag transceiver unit now consists of multiple antennas, it also allows for a method to switch among the multiple antennas to find the antenna or combination of antennas that create(s) the strongest RF communication link thereby enabling more efficient transmitted power or more directional reception coverage. Improving efficiency can be further improved by taking this concept one step further by adding multiple antennas into the interrogator unit. Now the possibility exists whereby the best RF communication possible can be established between the interrogator and transceiver units by switching to the best antenna combination that would most efficiently pass an RF signal between the interrogator and the transceiver. The antenna switching concept would work by having multiple antennas in either the interrogator unit or the tag transceiver unit or both.

The presence of multiple antennas creates an additional advantage in that when the antennas are not being used for communication, they are now free to be used for trickle charging the chargeable battery cell(s) that reside in the transceiver unit.

Also, the presence of multiple antennas creates an additional advantage in that each antenna combination has a different efficiency due to different orientations of polarizations, and is also helpful in minimizing the effects of multipath interference.

DETAILED DESCRIPTION OF THE PREFERRED EMBODIMENTS

Figure 1:
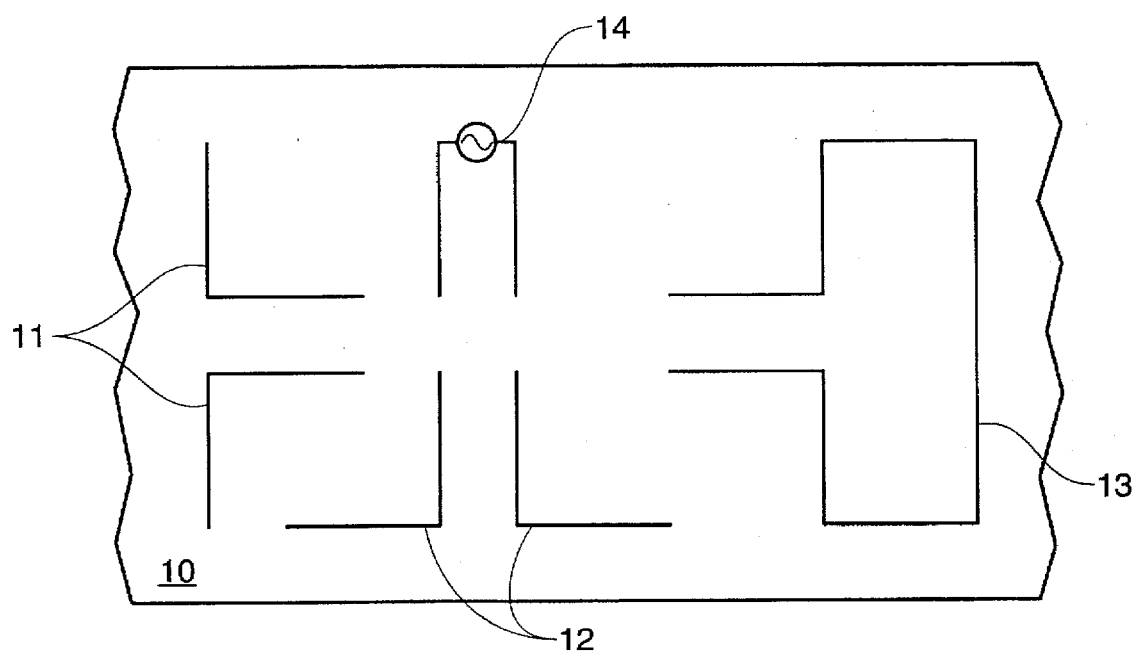
FIG. 1 shows a planar top view of an RFID transceiver unit containing two dipole antennas in combination with a loop antenna and a signal source or receiver.

Several concepts are intertwined in the drawings depicted in FIGS. 1 through FIGS. 3a and 3b as will be described hereinafter.

Referring now to FIG. 1, dipole antennas 11 and 12 have been processed onto substrate 10 which contains an RFID tag transceiver unit. Dipole antennas 11 and 12 have been processed onto substrate 10 at approximately 90° angles to one another. Loop antenna 13 has also been processed onto substrate 10 at approximately a 90° to the axis of antenna 12. RF source 14 has also been processed onto substrate 10 to represent a signal source or a receiver input depending on the mode of operation the transceiver unit is in.

Since an RF voltage will produce a toroidal shaped electromagnetic field centered about a dipole antenna, the particular antenna configuration depicted in FIG. 1 will effectively achieve a nearly spherical electromagnetic field pattern when combined by switching them one at a time to an RF transmitter or receiver. This combination of the three antenna patterns reduces or eliminates the lack of field on-axis of the dipole antennas, while using only antenna geometries lying within a two-dimensional plane of substrate 10. Since the combined coverage is approximately spherical, the orientation between the RFID transceiver (or tag) and the interrogator(s) becomes substantially irrelevant. And although the loop is shown in a rectangular layout, it could as well take other forms, such as circular.

Figure 2A:
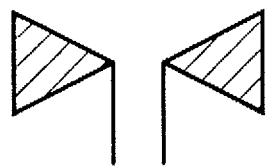
FIGS. 2a–2c depict examples of some of the possible antenna configurations that, when positioned in place of the dipoles and oriented with a loop antenna as shown in FIG. 1, will provide spherical antenna pattern coverage.
Figure 2B:
Figure 2C:

The dipole antennas of FIG. 1 may be replaced by an unlimited number of configurations, such as the antenna configurations presented in FIGS. 2a–2c, with the main stipulation being that to gain the optimum spherical electromagnetic field pattern it is preferred to have any two dipole antennas placed at approximately 90° to one another (however, they need not be if so desired). The many antenna configurations that one skilled in the art could come up with and that are arranged in the orientation as depicted in FIG. 1 may provide for a more optimum spherical pattern coverage or for achieving different impedance characteristics. Although the orientation of FIG. 1 is preferred, the intent of the present invention is to construe the concept of obtaining spherical pattern coverage from antennas lying in a two-dimensional plane.

Now that an antenna configuration that lies in a two-dimensional plane can be achieved with two dipole antennas and a loop antenna, communication within range between an interrogator and a planar RFID tag transceiver can be established no matter what the physical orientation between the two. The presence of multiple antennas allows for a second concept which will be referred to as antenna switching whereby, a higher operating efficiency is obtained by switching mechanically or electrically to the best combination of antennas (or to the single antenna) which presents the strongest RF communication link between interrogator and transceiver units.

For purposes of the antenna switching concept, the transceiver unit must contain circuitry capable of interpreting a command to switch and then to switch among the antennas. Digital logic could be used in conjunction with memory means, such as Static Random Access Memory (SRAM), Dynamic Random Access (DRAM) or the like. The presence of logic and volatile memory will also require a power supply means, such as rechargeable battery cells that are either permanently fabricated onto substrate 10 or separate cells, depending on one skilled in the art's choice of design or as technology progresses.

Figure 3A:
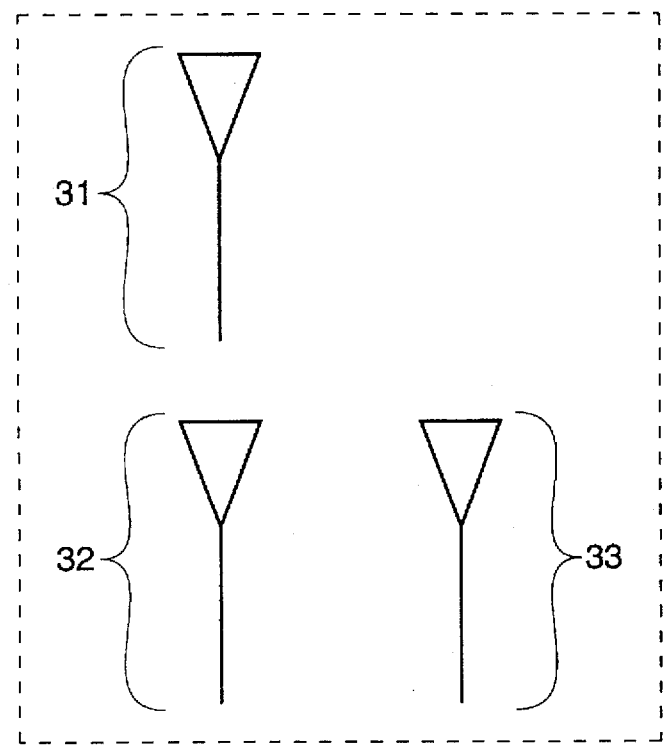
FIGS. 3a and 3b depict multiple antenna variations for use in a RFID system so that when contained in either the interrogator unit and for tag transceiver unit, antenna switching is possible.

An embodiment of antenna switching is discussed in light of FIGS. 1 and 3a. Referring now to FIG. 3a, an RFID interrogator unit's antenna system now contains multiple antennas 31, 32 and 33. The interrogator computer circuitry, under software control, switches to its first antenna, for example antenna 31, for transmitting a wake up call to the RFID transceiver's first antenna, say antenna 11 in FIG. 1. The transceiver circuitry wakes up and switches among its antennas 11, 12 and 13, thereby memorizing the power from each antenna by storing this information in the transceiver's resident memory. The interrogator then switches to its second antenna, say antenna 32, and again the transceiver switches among its antennas 11, 12 and 13, and stores the relative signal strength of each. This process continues until all possible antenna combinations between the interrogator and the transceiver are tried and memorized. Then logic circuitry residing in either the tag transceiver or interrogator units selects the best interrogator/transceiver RF link and switches to that combination for ensuing communications.

Figure 3B:
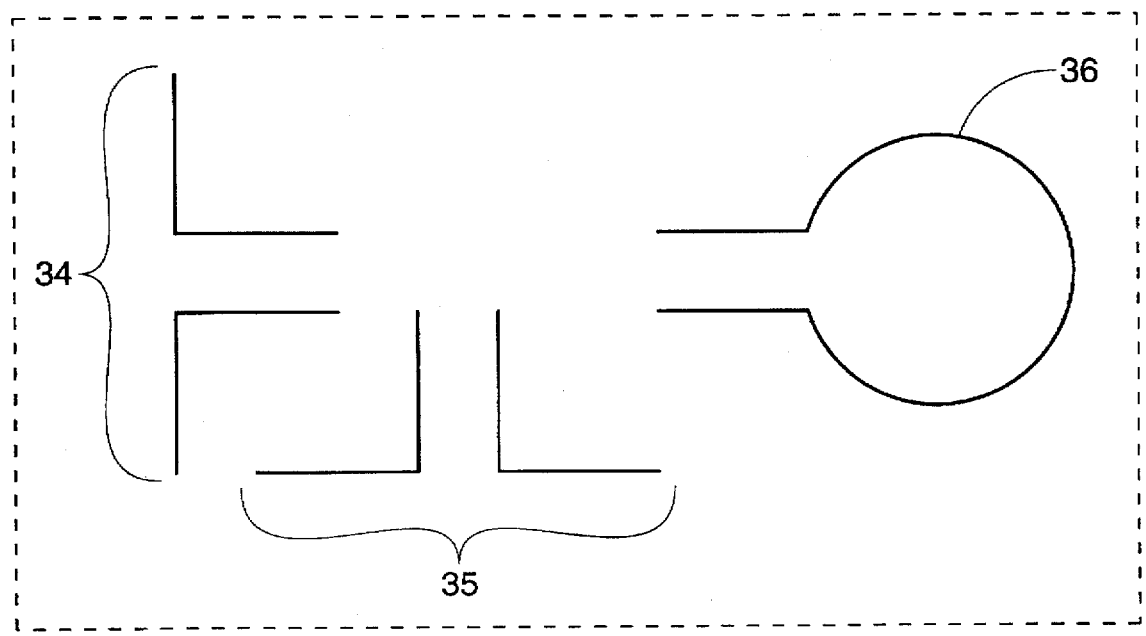

Antenna switching could also be accomplished by having multiple antennas resident in either the interrogator or the transceiver and follow the procedure just described, thereby establishing all possible antenna combinations. It is also conceivable to have other multiple antenna configurations resident in the interrogator unit like the configuration shown in FIG. 3b. In FIG. 3b, dipole antennas 34 and 35 are oriented in manner corresponding to transceiver antennas 11 and 12 of FIG. 1. Likewise, loop antenna 36 is oriented in a manner corresponding to transceiver loop antenna 13 of FIG. 1.

Another advantage of having multiple antennas that allows antenna switching in the transceiver unit is that they are available for the purposes of trickle charging the rechargeable battery resident in the transceiver unit.

It is to be understood that although the present invention has been described in several embodiments, various modifications known to those skilled in the art, such as having any number of antennas present in the interrogator or transceiver units, may be made without departing from the invention as recited in the several claims appended hereto.

I claim:

1. A radio frequency (RF) transceiver system comprising first and second sending/receiving units wherein at least one of the units contains multiple antennas constructed in a planar arrangement, said planar arrangement creating a spherical electromagnetic antenna pattern, wherein said multiple antennas comprise at least one dipole antenna and consist of a single loop antenna formed in a planar arrangement thereby creating a toroidal shaped electromagnetic field centered about each antenna axis and resulting in said spherical electromagnetic pattern.

2. The RF transceiver system of claim 1 wherein both said first and second units comprise said multiple antennas constructed in a planar arrangement.

3. The RF transceiver system of claim 1 wherein said first unit comprises said multiple antennas constructed in a planar arrangement.

4. The RF transceiver system of claim 1 wherein said second unit comprises said multiple antennas constructed in a planar arrangement.

5. The RF transceiver system of claim 1 wherein said first unit is an interrogator unit comprising said multiple antennas.

6. The RF transceiver system of claim 1 wherein said RF transceiver system comprises a radio frequency identification system.

7. The RF transceiver system of claim 1 wherein said second unit is a transceiver unit having said multiple antennas.

8. The RF transceiver system of claim 7 wherein said transceiver unit comprises decision making circuitry, volatile memory and a power source.

* * * * *